Patented Aug. 11, 1953

2,648,688

UNITED STATES PATENT OFFICE 2,648,688

PROCESS FOR PREPARING 21-ALKYL ETHERS OF CORTISONE

Huang Minlon, Metuchen, N. J., and John C. Babcock, Cambridge, Mass., assignors to Merck & Co., Inc., Rahway, N. J., a corporation of New Jersey No Drawing. Application December 23, 1950, Serial No. 202,566

13 Claims. (Cl. 260—397.4)

This invention is concerned generally with novel alkylated derivatives of cortisone and with novel processes for preparing the same. More particularly, it relates to $\Delta^4$-3,11,20-triketo-17-hydroxy-21-alkoxy pregnenes, to the process of preparing these 21-alkoxy pregnene compounds starting with $\Delta^{17}$-3,21-dihydroxy-11-keto-20-cyano-pregnene or 3,21-diacyl derivatives thereof, and to intermediate compounds utilized in said process.

The novel $\Delta^4$-3,11,20-triketo-17-hydroxy-21-alkoxy-pregnenes, subject to the present invention, may be chemically represented as follows:

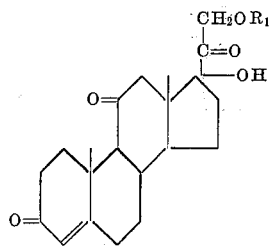

wherein $R_1$ is an alkyl radical.

Although $\Delta^4$ - 3,11,20 - triketo - 17,21 - dihydroxy-pregnene and 21-acyl derivatives thereof have been prepared heretofore, it has not yet proved feasible to prepare the corresponding 21-alkyl ethers using either the 21-hydroxy or the 21-acyloxy compound as a starting material. The 21-alkyl ethers of certain hydroxy steroids have been prepared by reacting the appropriate 21-halo derivative with alkali metal alcoholates and by reacting the 21-diazo derivatives with copper oxide and methanol. These methods are unsatisfactory for preparing 21-alkyl ethers of cortisone since no convenient method is available for the preparation of the requisite 21-halo and 21-diazo derivatives of $\Delta^4$-3,11,20-triketo-17,21-dihydroxy-pregnene.

We have now discovered, however, that $\Delta^4$ - 3,11,20 - triketo - 17 - hydroxy - 21 - alkoxy-pregnenes can be prepared by a novel procedure which is conducted as follows: $\Delta^{17}$-3,21-dihydroxy-11-keto-20-cyano-pregnene or its 3,21-diacyl derivatives (Compound 1 below) is reacted with an alkali, such as an alkali metal hydroxide, in solution in a lower aliphatic alcohol, thereby producing the corresponding $\Delta^{17}$-3-hydroxy-11-keto - 20 - cyano - 21 - alkoxy - pregnene (Compound 2). This compound is then reacted with an oxidizing agent thereby converting the hydroxy substituent in the 3-position to a keto radical to produce $\Delta^{17}$-3,11-diketo-20-cyano-21-alkoxy-pregnene (Compound 3). The latter compound is reacted with osmium tetroxide thereby producing the 17,20-osmate ester of 3,11-diketo - 17,20 - dihydroxy - 20 - cyano - 21 - alkoxy-pregnane (Compound 4), which is then reacted with a hydrolyzing agent to form 3,11,20-triketo-17-hydroxy-21-alkoxy pregnane (Compound 5). This pregnane compound is then reacted with bromine to form 3,11,20-triketo-4-bromo - 17 - hydroxy - 21 - alkoxy - pregnane (Compound 6) which is reacted with a dehydrohalogenating agent to form the desired $\Delta^4$-3,11,20 - triketo - 17 - hydroxy - 21 - alkoxy-pregnene (Compound 7).

Alternatively, the $\Delta^{17}$-3-hydroxy-11-keto-20-cyano-21-alkoxy-pregnene (Compound 2) can be reacted with osmium tetroxide, and the resulting 17,20-osmate ester of 3,17,20-trihydroxy-11-keto-20-cyano-pregnane (Compound 8) can be reacted with an oxidizing agent to produce the 17,20-osmate ester of 3,11-diketo-17,20-dihydroxy-20-cyano-21-alkoxy-pregnane (Compound 4).

The reactions indicated above can be chemically represented as follows:

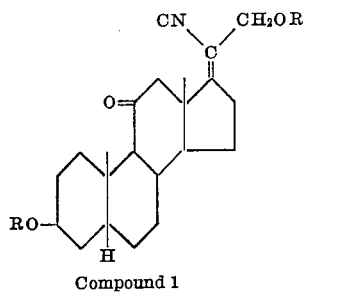

Compound 1

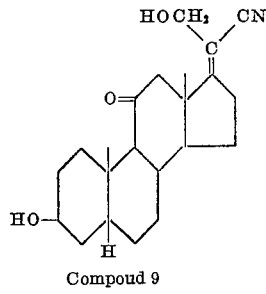

Compound 9

Alcoholic alkali

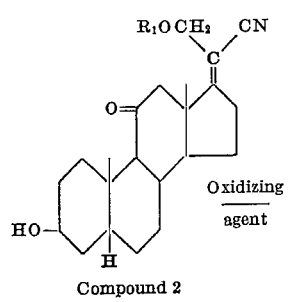

Compound 2

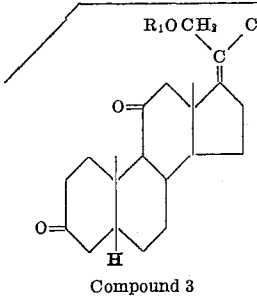

Compound 3

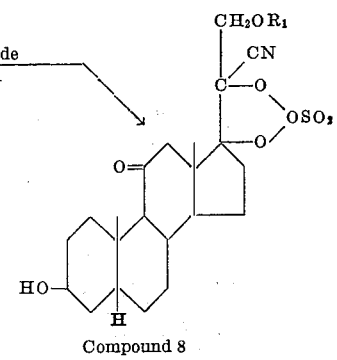

Compound 8

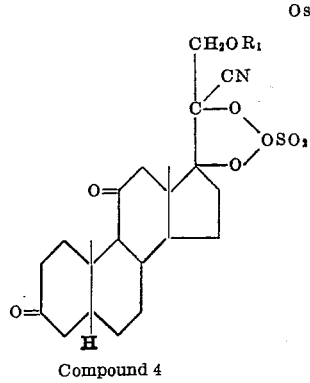

Compound 4

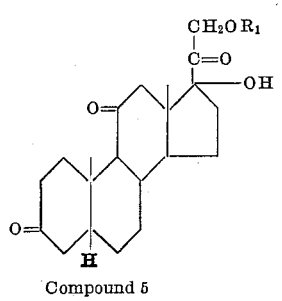

Compound 5

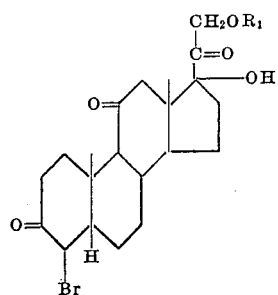

Compound 6

Compound 7

In the foregoing formulae, R is hydrogen or acyl, and $R_1$ is an alkyl radical.

Previously the conversion of $\Delta^{17}$-3,21-dihydroxy-11-keto-20-cyano-pregnene (or its 3,21-diacyl derivative) to compounds wherein the substituent in the 3-position is converted to a 3-keto group, while retaining in the 21-position a hydroxy or substituted-hydroxy grouping, has been achieved by other less satisfactory procedures. For example, this transformation has been achieved heretofore as follows: the $\Delta^{17}$-3,21-diacyloxy-11-keto-20-cyano-pregnene (where the diacylated compound is used as the starting material) is first hydrolyzed to the corresponding $\Delta^{17}$-3,21-dihydroxy-11-keto-20-cyano-pregnene. The $\Delta^{17}$-3,21-dihydroxy-11-keto-20-cyano-pregnene is then subjected to a partial acylation reaction whereby the primary 21-hydroxy substituent is preferentially acylated while leaving the secondary 3-hydroxy radical unchanged. The resulting $\Delta^{17}$-3-hydroxy-11-keto-20-cyano-21-acetoxy-pregnene is readily oxidized to the corresponding 3-keto-derivative without affecting the 21-acetoxy substituent. Alternatively, the $\Delta^{17}$-3-hydroxy-11-keto-20-cyano-21-acetoxy-pregnene can be reacted with osmium tetroxide, and the resulting 17,20-osmate ester of 3,17,20-trihydroxy-11-keto-20-cyano-21-acetoxypregnene oxidized to the corresponding 3-keto derivative utilizing chromic acid. The overall yield obtained according to the foregoing procedures, however, has ordinarily been less than about 50% due, in part, to the fact that the foregoing partial acylation reaction is not clear-cut, and results in the formation of a considerable amount of diacylated by-product.

It was therefore an object of the present invention to accomplish the conversion of the 3-hydroxy grouping in $\Delta^{17}$-3,21-dihydroxy-11-keto-20-cyano-pregnene to the corresponding 3-keto-radical without oxidizing the hydroxyl substituent attached to the 21-carbon atom. It was a further object to accomplish this conversion by selectively (and quantitatively) converting the 21-hydroxy radical to a substituent stable to oxidation treatment while, at the same time, leaving the hydroxy radical in the 3-position unchanged. These objects have been achieved, according to the present invention, and as indicated hereinabove, by reacting $\Delta^{17}$-3,21-dihydroxy-11-keto-20-cyano-pregnene with an alcoholic alkali, whereby the 21-hydroxy radical is selectively etherified without affecting the hydroxy grouping in the 3-position. Moreover, we have discovered that when this novel reaction procedure is employed, the resulting $\Delta^{17}$-3-hydroxy-11-keto-20-cyano-21-alkoxy-pregnene can be recovered from the reaction mixture in a yield of over 80% of that theoretically obtainable.

It is a feature of the present invention that it is possible to utilize, as the starting material in the presently-disclosed process, besides the $\Delta^{17}$-3,21-dihydroxy-11-keto-20-cyano-pregnene, also 3,21-diacyloxy derivatives thereof, without the necessity for subjecting such diacylated compounds to a preliminary hydrolysis operation. When $\Delta^{17}$-3,21-diacyloxy-11-keto-20-cyano-pregnene is reacted with alcoholic alkali, the desired $\Delta^{17}$-3-hydroxy-11-keto-20-cyano-21-alkoxy-pregnene is produced directly and can be recovered from the reaction mixture in a yield of over 80% of theory based on the $\Delta^{17}$-3,21-diacyloxy-11-keto-20-cyano-pregnene starting material.

Although we do not wish to be bound by theoretical considerations, we believe that the $\Delta^{17}$-3,21-dihydroxy-11-keto-20-cyano-pregnene, whether utilized as the starting material or obtained as an intermediate by hydrolysis of the corresponding $\Delta^{17}$-3,21-diacyloxy-11-keto-20-cyano-pregnene, is initially converted by the action of alcoholic alkali into the geometric isomer of the $\Delta^{17}$-3,21-dihydroxy-11-keto-20-cyano-pregnene starting material (Compound 9 on page 4), and that this isomer is, in turn, converted by the alcoholic alkali to the corresponding $\Delta^{17}$-3-hydroxy-11-keto-20-cyano-21-alkoxy-pregnene. It is postulated that, in said geometric isomer of $\Delta^{17}$-3,21-dihydroxy-11-keto-20-cyano-pregnene, the positions of the substituents attached to the 20-carbon atom of the $\Delta^{17}$ double bond is interchanged from that in the starting material. The foregoing theory is supported by the discovery that, when the isomer of $\Delta^{17}$-3,21-dihydroxy-11-keto-20-cyano-pregnene melting at 260–262° C. is reacted with an alkali metal hydroxide in solution in dioxane there is obtained, as sole product, the geometric isomer of $\Delta^{17}$-3,21-dihydroxy-11-keto-20-cyano-pregnene melting at 234–235° C. Moreover, when the reaction between alcoholic alkali and $\Delta^{17}$-3,21-dihydroxy-11-keto-20-cyano-pregnene, (M. P. 260–262° C.) or its diacyl derivative, is carried out for a short period of time, there is obtained a mixture containing said geometric isomer of $\Delta^{17}$-3,21-dihydroxy-11-keto-20-cyano-pregnene (M. P. 234–235° C.) admixed with $\Delta^{17}$-3-hydroxy-11-keto-20-cyano-21-alkoxy-pregnene. The theory is also substantiated by the further discovery that said geometric isomer of $\Delta^{17}$-3,21-dihydroxy-11-keto-20-cyano-pregnene (M. P. 234–235° C.) can, in turn, be converted, by reaction with alcoholic alkali to $\Delta^{17}$-3-hydroxy-11-keto-20-cyano-21-alkoxy-pregnene in a yield of over 80% of theory.

The proportion of the geometric isomer of $\Delta^{17}$-3,21-dihydroxy-11-keto-20-cyano-pregnene and of $\Delta^{17}$-3-hydroxy-11-keto-20-cyano-21-alkoxy-pregnene in the mixture depends on the length of time the reaction mixture is allowed to stand. For example, when a solution of the $\Delta^{17}$-3,21-dihydroxy-11-keto-20-cyano-pregnene starting material in a 3% methanolic solution of potassium hydroxide is allowed to stand for a period of 24 hours or longer, the $\Delta^{17}$-3-hydroxy-11-keto-20-cyano-21-alkoxy-pregnene predominates and can be isolated in a yield of over 80% of theory. When the reaction time is shortened to 3–4 hours, there is obtained a mixture of the geometric isomer of $\Delta^{17}$-3,21-dihydroxy-11-keto-20-cyano-pregnene and its 21-alkoxy derivative wherein the 3,21-dihydroxy compound predominates, together with some unchanged starting material.

In carrying out our improved process, the $\Delta^{17}$-3,21-dihydroxy-11-keto-20-cyano-pregnene, or a diacylated derivative thereof such as $\Delta^{17}$-3,21-diacetoxy-11-keto-20-cyano-pregnene, $\Delta^{17}$-3,21-dipropionoxy-11-keto-20-cyano-pregnene, the $\Delta^{17}$-3,21-dibenzoxy-11-keto-20-cyano-pregnene, and the like, is dissolved in a primary alcohol, such as methyl alcohol, ethyl alcohol, propyl alcohol, benzyl alcohol, and the like, and to this solution is added an aqueous solution of an alkali metal hydroxide, such as aqueous sodium hydroxide, aqueous potassium hydroxide, and the like. Alternatively, the pregnene compound can be added to an alcoholic solution containing the alkali metal hydroxide. The resulting mixture is allowed to stand at about room temperature for a period of time sufficient to accomplish the transformation of the starting material into the corresponding $\Delta^{17}$-3-hydroxy-11-keto-20-cyano-21-alkoxy-pregnene. The 21-alkoxy substituent in the product corresponds to the lower aliphatic alcohol utilized as the solvent for the reaction. For example, when the reaction is carried out utilizing a methanolic solution of an alkali metal hydroxide, the product formed is $\Delta^{17}$-3-hydroxy-11-keto-20-cyano-21-methoxy-pregnene. The time required for completion of the reaction varies depending upon the concentration of alcoholic alkali utilized. It is ordinarily preferred to employ a solution containing approximately 3% by weight of alkali metal hydroxide based on the total quantity of alcohol solvent present; when an alcoholic alkali of this concentration is utilized, the reaction is ordinarily complete in about 24 hours.

The $\Delta^{17}$-3-hydroxy-11-keto-20-cyano-21-alkoxy-pregnene is conveniently recovered from the reaction mixture by diluting the reaction mixture with water and cooling the aqueous mixture thus formed, whereupon the product crystallizes and can be recovered by filtration. The crude material thus obtained can be purified and separated into its individual components, if desired, by dissolving in a minimum volume of a chloroform benzene mixture, and chromatographing over alumina. Elution of the chromatograph with benzene produces no product; the major portion of the material is eluted therefrom utilizing chloroform, and the residual material is eluted by means of acetone. Recrystallization of the chloroform fraction from a chloroform-petroleum ether solvent gives the $\Delta^{17}$-3-hydroxy-11-keto-20-cyano-21-alkoxy - pregnene in substantially pure form. Recrystallization of the acetone fraction of the chromatograph from chloroform-petroleum ether solvent gives the geometric isomer of the $\Delta^{17}$-3,21-dihydroxy-11-keto-20-cyano-pregnene starting material in substantially pure form. The melting point of said geometric isomer is 234–235° C., as compared with the melting point of said starting material which is 260–262° C. As noted hereinabove, this geometric isomer can be treated with alcoholic alkali to yield an additional quantity of $\Delta^{17}$-3-hydroxy-11-keto-20-cyano-21-alkoxy - pregnene.

The $\Delta^{17}$-3-hydroxy - 11 - keto-20-cyano-21-alkoxy-pregnene can be oxidized to the corresponding 3-keto-derivative by reaction with an oxidizing agent such as N-bromoacetamide or N-bromosuccinimide. Where N-bromoacetamide or N-bromosuccinimide is used as the oxidizing agent, the $\Delta^{17}$-3-hydroxy-11-keto-20-cyano-21-alkoxy-pregnene is ordinarily dissolved in an organic solvent such as pyridine, tertiary butyl alcohol, methanol, and the like, and the oxidizing agent is added to the solution. The amount of N-bromoacetamide or N-bromosuccinimide employed in the oxidation reaction may vary from 1.5 to 3 moles per mole of $\Delta^{17}$-3-hydroxy-11-keto-20 - cyano - 21 - alkoxy-pregnene. The preferred solvent is methanol, preferably containing a small amount of pyridine. The oxidation is ordinarily carried out at a temperature between about 18 and 40° C. and for a period of about 6 to 30 hours.

The resulting $\Delta^{17}$-3,11-diketo-20-cyano-21-alkoxy-pregnene is then treated with osmium tetroxide, preferably in the presence of an organic solvent such as pyridine, thereby forming the 17,20-osmate ester of the corresponding 3,11-diketo-17,20-dihydroxy - 20 - cyano - 21 - alkoxy-pregnane, such as the 17,20-osmate ester of 3,11-diketo-17,20-dihydroxy - 20 - cyano-21-methoxy-pregnane, the 17,20-osmate ester of 3,11-diketo-17,20-dihydroxy-20-cyano-21-ethoxy - pregnane, the 17,20-osmate ester of 3,11-diketo-17,20-dihydroxy - 20 - cyano-21-propoxy-pregnane, and the like.

As set forth hereinabove, this 17,20-osmate ester of the 3,11-diketo - 17,20 - dihydroxy - 20-cyano-21-alkoxy-pregnane can be prepared starting with the $\Delta^{17}$-3-hydroxy-11-keto-20-cyano-21-alkoxy-pregnene by reacting the latter compound with osmium tetroxide, preferably in the presence of an organic solvent such as pyridine, thereby forming the 17,20-osmate ester of 3,17,20-trihydroxy-11-keto-20-cyano-21-alkoxy - pregnane. The nuclear hydroxyl grouping in the 3-position of the latter compound can then be oxidized to the corresponding 3-keto substituent by reacting said 17,20-osmate ester with a strong oxidizing agent, such as chromic acid, potassium permanganate, hypobromous acid, and the like. It is ordinarily preferred to carry out this oxidation reaction utilizing chromic acid in acetic acid solution.

The 17,20-osmate ester of the 3,11-diketo-17,20-dihydroxy-20-cyano-21 - alkoxy-pregnane, prepared by either of the foregoing procedures, is reacted with a hydrolyzing agent. Instead of isolating the osmate ester, however, the reaction solution obtained from either the osmylation or oxidation procedures may be used, after neutralization, in this hydrolysis operation. Suitable hydrolyzing agents include aqueous alkali, or an aqueous alkaline solution of a polyhydroxy alcohol, such as mannitol, or an aqueous alkaline formaldehyde solution, or aqueous sodium sulfite. The preferred hydrolyzing agent comprises aqueous sodium sulfite and potassium bicarbonate, and the hydrolysis reaction is conveniently carried out at room temperature. Under these preferred hydrolysis conditions, the reaction is substantially complete in approximately 15 hours. The reaction mixture is filtered, evaporated to small volume, and extracted with chloroform. The chloroform extract is then evaporated to dryness to produce the corresponding 3,11,20-triketo-17-hydroxy-21-alkoxy-pregnane, such as, for example, 3,11,20 - triketo - 17 - hydroxy - 21-methoxy - pregnane, 3,11,20-triketo-17-hydroxy-21-ethoxy-pregnane, 3,11,20-triketo-17-hydroxy-21 - propoxy - pregnane, 3,11,20 - triketo - 17-hydroxy-21-butoxy-pregnane, and the like.

The 3,11,20-triketo - 17 - hydroxy-21-alkoxy-pregnane is then reacted with bromine, preferably in the presence of acetic acid, thereby producing the corresponding 3,11,20 - triketo - 4-bromo-17-hydroxy - 21 - alkoxy-pregnane. This compound is conveniently recovered from the reaction mixture by diluting the same with water, and extracting the resulting suspension with chloroform. The chloroform extract is washed with water, evaporated to dryness, and the residual material purified by recrystallization from acetone-ether.

The 3,11,20-triketo - 4 - bromo-17-hydroxy-21-alkoxy-pregnane, prepared as described hereinabove, is then reacted with a dehydrohalogenating agent, such as pyridine, or collidine, whereby the elements of hydrogen bromide are removed from the molecule to produce $\Delta^4$-3,11,20-triketo-17-hydroxy-21-alkoxy-pregnene. Alternatively, this dehydrohalogenation reaction can be conducted by reacting the 3,11,20-triketo-4-bromo-17-hydroxy-21-alkoxy-pregnane with an aryl hydrazine, preferably 2,4-dinitrophenyl hydrazine to produce the 2,4-dinitrophenylhydrazone of said 3,11,20-triketo-4-bromo-17-hydroxy-21-alkoxy-pregnane which readily loses the elements of hydrogen bromide to form the $\Delta^4$-double bond, followed by treatment of the resulting 2,4-dinitrophenyl hydrazone of $\Delta^4$-3,11,20-triketo-17-hydroxy-21-alkoxy-pregnene with pyruvic acid and glacial acetic acid to produce the desired $\Delta^4$-3,11,20-triketo-17-hydroxy-21-alkoxy-pregnene.

The dehydrohalogenation reaction, where collidine is employed, is conveniently carried out by heating the reaction mixture under reflux for a period of approximately 5 hours. The collidine is then evaporated under reduced pressure, the residue is dissolved in an organic solvent, such as chloroform, and the organic solvent extract is washed with dilute aqueous acid solution (to remove residual collidine) and then with water. The organic solvent extract is then evaporated under reduced pressure, and the residual material purified by recrystallization from alcohol to produce, in substantially pure form, the corresponding $\Delta^4$ - 3,11,20-triketo-17-hydroxy-21-alkoxy-pregnene, such as, for example, $\Delta^4$-3,11,20-triketo-17-21-methoxy-pregnene, $\Delta^4$-3,11,20 - triketo-17-hydroxy-21-ethoxy-pregnene, $\Delta^4$-3,11,20-triketo-17-hydroxy - 21 - propoxy-pregnene, and the like.

The following examples illustrate methods of carrying out the present invention, but it is to be understood that these examples are given for purposes of illustration and not of limitation.

*Example 1*

A solution of 18 g. of sodium hydroxide in 90 cc. of water was added to a solution containing 12 g. of $\Delta^{17}$-3,21-dihydroxy-11-keto-20-cyano-pregnene (M. P. 260–262° C.) dissolved in 500 cc. of absolute methanol. The resulting mixture was vigorously agitated to mix the components and was then allowed to stand at room temperature for a period of 48 hours. The reaction mixture was diluted with 1200 cc. of water and the resulting crystalline slurry was chilled overnight and filtered. The crystalline product was washed with water until the washings were neutral, and air-dried at a temperature of approximately 90° C. to give 10.8 g. of impure $\Delta^{17}$-3-hydroxy-11-keto - 20 - cyano - 21 - methoxy - pregnene contaminated with the geometric isomer of the $\Delta^{17}$-3,21-dihydroxy-11-keto-20-cyano-pregnene starting material. The melting point of the impure product thus obtained was 210–213° C.

This crude product was dissolved in a minimum volume of 1:1 mixture of chloroform and benzene, and then chromatographed by passage through a column containing 160 g. of acid-washed alumina prepared in benzene. The resulting adsorbate was then eluted, in order, with benzene, with chloroform, and finally with acetone. No material was eluted by the benzene. Evaporation of the chloroform eluate gave 9.35 g. of crystals; M. P. 216–221° C. Evaporation of the acetone eluate gave 1.37 g. of crystals; M. P. 224–232° C.

Recrystallization of the 9.35 g. "chloroform fraction" from chloroform-petroleum ether (B. P. 90–115° C.) gave 8.65 g. of substantially pure $\Delta^{17}$-3 - hydroxy - 11 - keto - 20 - cyano - 21 - methoxypregnene; M. P. 220–222° C. A sample of this product was further purified by repeated recrystallization from chloroform-petroleum ether to give an analytically pure sample; M. P. 221–222° C.; $[\alpha]_D = +46$ (C=1% in acetone). Anal. calc'd for $C_{23}H_{33}O_3N$: C, 74.35; H, 8.95; N, 3.77; found: C, 74.34; H, 8.85; N, 3.94; active hydrogen calc'd: 1; found: 1.1 at room temperature.

This product was further characterized by acetylation utilizing pyridine and acetic anhydride as the acetylating agent. Whether the acetylation reaction was carried out by allowing the $\Delta^{17}$ - 3 - hydroxy - 11 - keto - 20 - cyano - 21-methoxy-pregnene to stand at room temperature overnight, or by heating the mixture of the reactants under reflux for a period of ¾ hour, the only product obtained was the monoacetate, $\Delta^{17}$-3 - acetoxy - 11 - keto - 20 - cyano - 21 - methoxypregnene; M. P. 158–159° C.; $[\alpha]_D^{24°} = +75°$ (C=1% in acetone); anal. calc'd for $C_{25}H_{35}O_4N$: C, 72.37; H, 8.53; N, 3.39; CH$_3$O, 7.5; CH$_3$CO, 10.4; found: C, 71.97; H, 8.40; N, 3.79; CH$_3$O, 6.6; CH$_3$CO, 11.63.

Recrystallization of the 1.37 g. "acetone-fraction" of the chromatograph (obtained hereinabove) from chloroform-petroleum ether (B. P. 90–115° C.) gave 1.05 g. of the geometric isomer of the $\Delta^{17}$-3,21-dihydroxy-11-keto-20-cyano-pregnene starting material; M. P. 234–235° C. (as compared with the M. P. of the starting isomer which was 260–262° C.); $[\alpha]_D^{24°} = +50°$ (C=1% in acetone); anal. calc'd for $C_{22}H_{31}O_3N$: C, 73.91; H, 8.74; N, 3.92; found: C, 74.16; H, 8.75; N, 4.08.

This product was further characterized by acetylation utilizing acetic anhydride and pyridine as the acetylating agent. 0.28 g. of said geometric isomer of $\Delta^{17}$-3,21-dihydroxy-11-keto-20-cyano-pregnene was reacted for a period of about 15 hours at room temperature with 1.5 cc. acetic anhydride and 1.5 cc. pyridine. The reaction mixture was diluted with water to give 0.23 g. of the corresponding geometric isomer of $\Delta^{17}$-3,21-diacetoxy-11-keto-20-cyano-pregnene which, after recrystallization from methanol, melted at 134–135° C.; $[\alpha]_D^{25°} = +80°$ (C=1% in acetone); anal. calc'd for $C_{26}H_{35}O_5N$: C, 70.72; H, 7.99; N, 3.17; found: C, 70.85; H, 8.06; N, 3.35.

*Example 2*

0.5 g. of the isomer of $\Delta^{17}$-3,21-dihydroxy-11-keto-20-cyano-pregnene (M. P. 234–235° C.) was dissolved in 17.5 cc. of methanol and to this solution was added a solution containing 0.6 g. of sodium hydroxide dissolved in 1.5 cc. water and 1 cc. of methanol. The resulting mixture was allowed to stand at room temperature for a period of 24 hours, and the reaction mixture was diluted with 80 cc. of water. The aqueous mixture was cooled to about 0° C., the crystalline slurry thus obtained was filtered and the crystalline product was dried to give 0.45 g. of crude material; M. P. 209–212° C.

0.3 g. of this crude material was dissolved in 10 cc. of chloroform and chromatographed through 12 g. of acid-washed alumina. The adsorbate was eluted first with chloroform and then with acetone, and the eluates were evaporated to dryness separately to give 0.269 g. of a "chloroform fraction" (M. P. 218–221° C.) and 0.021 g. of an "acetone fraction" (M. P. 228–234° C.).

Recrystallization of the acetone-fraction from chloroform-petroleum ether gave 0.014 g. of unchanged starting material, i. e., the geometric isomer of $\Delta^{17}$-3,21-dihydroxy-11-keto-20-cyano-pregnene melting at 234° C.

Recrystallization of the "chloroform fraction" from chloroform-petroleum ether gave 0.23 g. of substantially pure $\Delta^{17}$-3-hydroxy-11-keto-20-cyano-21-methoxy-pregnene; M. P. 221–222.5° C. The melting point of a mixture of this product with the 234–235° C. isomer of $\Delta^{17}$-3,21-dihydroxy-11-keto-20-cyano-pregnene (used as starting material in this example) was depressed. There was no depression in melting point when this material was admixed with $\Delta^{17}$-3-hydroxy-11-keto-20-cyano-21-methoxy-pregnene (as prepared hereinabove starting with the 260–262° C. melting isomer of $\Delta^{17}$-3,21-dihydroxy-11-keto-20-cyano-pregnene).

*Example 3*

A solution of 12 g. of sodium hydroxide in 50 cc. of water was added to a solution containing 10 g. of $\Delta^{17}$-3,21-dihydroxy-11-keto-20-cyano-pregnene (M. P. 260–262° C.) dissolved in 350 cc. of absolute ethanol, and the atmosphere above the solution was replaced by nitrogen. The resulting mixture was allowed to stand at room temperature for a period of 24 hours, at the end of which period the color of the solution was wine-red.

The reaction mixture was neutralized with 2.5 N-hydrochloric acid and diluted with 750 cc. of water. The crystalline slurry was chilled for a period of 6 hours and filtered. The crystalline product was washed with water until the washings were neutral and air-dried in vacuo at a temperature of approximately 50° C. to give 10 g. of impure $\Delta^{17}$-3-hydroxy-11-keto-20-cyano- 21-ethoxy-pregnene contaminated with the geometric isomer of the $\Delta^{17}$-3,21-dihydroxy-11-keto-20 - cyano - pregnene starting material. The melting point of the impure product thus obtained was 101-130° C.

This crude product was dissolved in a 1:1 mixture of chloroform and benzene, and then chromatographed by passage through a column containing 170 g. of acid-washed alumina prepared in benzene. The resulting adsorbate was then eluted, first with chloroform, then with a 1:1 mixture of chloroform and acetone, and finally with acetone.

The acetone eluate from the chromatogram gave 2.5 g. of an oil which may be purified, if desired, to give the geometric isomer of the $\Delta^{17}$-3,21 - dihydroxy-11-keto-20 - cyano-pregnene starting material.

The chloroform and chloroform-acetone (1:1) eluted, in the first fractions, 6.7 g. of a substance which was recovered by evaporation of the eluates. When this material was rubbed with methanol it solidified to give a product which melted between 90 and 105° C. This crude solid material was purified by repeated recrystallization from acetone-petroleum ether (B. P. 75-115° C.) until a constant melting point was reached, thereby giving 3 g. of substantially pure $\Delta^{17}$-3 - hydroxy-11-keto-20-cyano-21-ethoxy - pregene; M. P. 144-145° C. (as determined on material which was thoroughly powdered before drying) $[\alpha]_D^{25°} = +47°$ (C=1% in acetone). Anal. calc'd. for $C_{24}H_{35}O_3N$; C, 74.76; H, 9.15; N, 3.63; found: C. 74.75; H, 9.00; N, 3.92.

This product was further characterized by acetylation utilizing pyridine-acetic anhydride as the acetylating agent. The crude acetylated product thus obtained was purified by recrystallizaion from alcohol to give, as the sole product, the monoacetate, $\Delta^{17}$-3-acetoxy-11-keto-20-cyano-21-ethoxy-pregnene in substantially pure form; M. P. 139.5-140.5° C. $[\alpha]_D^{23°} = 73.5°$ (C=1% in acetone); anal. calc'd. for $C_{26}H_{37}O_4N$; C, 73.03; H, 8.72; N, 3.27; $C_2H_5O$, 10.52; found: C, 72.94; H, 8.72; N, 3.37; $C_3H_5O$, 8.20.

*Example 4*

1.0 g. of osmium tetroxide was added to a solution containing 1 g. of $\Delta^{17}$-3-acetoxy-11-keto-20-cyano-21-methoxy-pregnene in 1 cc. of pyridine and 10 cc. of benzene. The resulting mixture was allowed to stand at approximately room temperature for a period of 6 days. The reaction mixture was then diluted with 40 cc. of methanol, and a solution containing 4 g. of sodium sulfite and 1.8 g. of sodium hydroxide dissolved in 50 cc. of water was added thereto. The resulting mixture was stirred vigorously for a period of about 15 hours, and the mixture thus obtained was extracted with 7 portions of chloroform. The combined chloroform extracts were washed with water until neutral, dried over sodium sulfate, and the solvent was evaporated in vacuo to produce 0.788 g. of 3,17-dihydroxy-11,20-diketo-21-methoxy-pregnane which was obtained in the form of a glassy solid.

This product was dissolved in 2 cc. of pyridine, and 2 cc. of acetic anhydride was added to the resulting solution. This mixture was allowed to stand overnight, the reaction mixture was mixed with 40 cc. of water ( to decompose excess acetic anhydride), and the aqueous solution was extracted with 6 portions of chloroform. The combined chloroform extracts were thoroughly washed with water, dilute aqueous hydrochloric acid, and aqueous sodium bicarbonate solution. The chloroform extracts were then dried over anhydrous sodium sulfate, and evaporated to a volume of 5 cc.

This solution was passed through an alumina column prepared in benzene and the resulting chromatogram was eluted with chloroform. Cut 1 was partially crystalline, cuts 2 and 3 were crystalline, cut 4 was an oil, and cut 5 upon evaporation yielded no product. Cuts 1, 2 and 3 were combined and recrystallized from methanol (including treatment of the methanol solution of the product with activated charcoal followed by filtration) to produce 0.40 g. of 3-acetoxy-11,20-diketo-17-hydroxy - 21 - methoxy - pregnane; M. P. 198-202° C. This product was further purified by recrystallization from methanol to give material melting at 201-202° C. Analysis calc'd for $C_{24}H_{36}O_6$; C, 68.54; H, 8.63; found: C, 68.42; 68.66; H, 8.49; 8.78.

*Example 5*

Six g. of $\Delta^{17}$-3-hydroxy-11-keto-20-cyano-21-methoxy-pregnene were dissolved in a mixture of 50 cc. of t-butanol and 15 cc. of pyridine. Two cc. of water and 5.6 g. of N-bromoacetamide were added to the resulting solution and the mixture was stirred in the dark at room temerature for a period of approximately 17 hours. The reaction mixture was diluted with 180 cc. of water while stirring and cooling the resulting solution whereupon a crystalline product precipitated. The crystalline slurry was filtered, and the crystalline filter cake was washed with a small volume of water. The filter cake was dissolved without drying in 40 cc. of glacial acetic acid and treated at a temperature of 40° C. with 1.5 g. of zinc dust which was added in several portions to the acetic acid solution. Activated charcoal was then added to the resulting mixture which was filtered at 40° C., and the filtrate was then diluted with 150 cc. of water whereupon the product in solution crystallized. This crystalline material was recovered by filtration and dried to give 5.6 g. of substantially pure $\Delta^{17}$ - 3,11 - diketo - 20 - cyano-21-methoxy-pregnene; M. P. 209-210° C.; yield approximately 93% of theory.

A sample of this material was further purified by recrystallization from dilute methanol to produce $\Delta^{17}$-3,11-diketo-20-cyano-21-methoxy-pregnane melting at 209-211° C. $[\alpha]_D^{24°} = +55°$ (C=1% in methanol); analysis calc'd for $C_{23}H_{31}O_3N$; C, 74.76; H, 8.46; N, 3.79; found: C, 74.83; H, 8.37; N, 4.01.

*Example 6*

8 grams of $\Delta^{17}$-3,11-diketo-20-cyano-21-methoxy-pregnene were dissolved in 100 cc. of benzene containing 8 cc. of pyridine. 9.6 g. of osmium tetroxide were added to this solution, and the resulting mixture was allowed to stand at room temperature for approximately 5 days. The reaction mixture was then diluted with 160 cc. of chloroform and 200 cc. of methanol. To the resulting solution was added 280 cc. of an aqueous solution containing 58 g. of sodium sulfite and 58 g. of potassium bicarbonate. The mixture thus obtained was stirred (at room temperature) for a period of approximately 24 hours, and the reaction mixture was filtered through diatomaceous silica (Supercel) and the Supercel cake was washed thoroughly with chloroform. The filtrate was separated into an organic layer and an aqueous layer, and the aqueous layer was extracted with chloroform. The organic layer and chloroform extract were combined and the mixture was washed thoroughly with aqueous sodium carbonate solution, then with dilute aqueous hydrochloric acid solution, and finally with aqueous sodium bicarbonate solution. The washed chloroform extracts were dried and evaporated to give 7.28 g. of an oil. This oil was crystallized from acetone-petroleum ether (B. P. 90–115° C.) to give 6.22 g. of dense prisms of substantially pure 3,11,20 - triketo - 17 - hydroxy - 21 - methoxy - pregnane; M. P. 164–166° C.; $[\alpha]_D^{24°} = +76°$ (C=1% in methanol); analysis calc'd for $C_{22}H_{32}O_5$; C, 70.18; H, 8.57; found: C, 70.55; H, 8.51.

*Example 7*

Two g. (5.31 millimoles) of 3,11,20-triketo-17-hydroxy-21-methoxy-pregnane were dissolved in 40 cc. of pure glacial acetic acid and 1 cc. of 1N hydrobromic acid in acetic acid was added to the solution. A solution of 5.31mM. bromine and 5.31 mM. sodium acetate dissolved in 10.4 cc. acetic acid was added to the solution of the pregnane compound. During the addition of the bromine solution, the temperature of the reaction mixture was maintained at 25° C., and the bromine solution was added dropwise at such a rate that each drop was decolorized. The reaction mixture was immediately diluted with 400 cc. of water and the aqueous mixture was extracted with chloroform. The chloroform solution was washed with water, then with aqueous sodium bicarbonate solution, and dried. The dry chloroform solution was then evaporated to give a crude 3,11,20-triketo-4-bromo-17-hydroxy-21-methoxy-pregnane which was obtained as an oil. A small amount of this oil was further purified by recrystallization from chloroform-petroleum ether (B. P. 90–115° C.) to give crystals which decomposed near 185–187° C. depending on the rate of heating; $[\alpha]_D^{24°} = +114°$ (C=1% in methanol). Analysis calc'd for $C_{22}H_{31}O_5Br$; C, 58.02; H, 6.86; Br, 17.56; found: C, 58.32; H, 6.61; Br, 17.46.

7.9 g. of the crude oily 3,11,20-triketo-4-bromo-17-hydroxy-21-methoxy-pregnane was dried by benzene distillation in vacuo, and the dried oil was dissolved in 25 cc. of redistilled collidine. The resulting solution was heated under reflux under a nitrogen atmosphere for a period of approximately ½ hour. The collidine hydrobromide thus formed was removed by filtration, the dark filtrate was distilled in vacuo, and the residual material was dissolved in chloroform. The chloroform solution was washed with water, then with dilute aqueous hydrochloric acid, and finally with aqueous sodium bicarbonate solution. The washed chloroform solution was dried, filtered and distilled in vacuo at a temperature of 25° C. to give an oil which was dried by benzene distillation in vacuo. The dry oil was dissolved in a small amount of chloroform, and the chloroform solution chromatographed by passage through acid-washed alumina. The alumina adsorbate was eluted, in order, with benzene, benzene-chloroform (10:1; 1:1; 1:9); pure chloroform; and finally with acetone. By evaporation of the middle fractions (eluted with benzene-chloroform 1:1 and 1:9) there was isolated 0.52 g. of a crude crystalline product (M. P. 227–240° C.). This material was further purified by repeated recrystallization from methanol (including treatment of the methanol solution with activated charcoal followed by filtration) thereby producing substantially pure $\Delta^4$-3,11,20-triketo-17-hydroxy-21-methoxy-pregnene; M. P. 250–253° C.; analysis calc'd for $C_{22}H_{30}O_5$; C, 70.56; H, 8.08; $CH_3O$, 8.28; found: C, 70.73; 70.77; H, 7.80; 7.77; $CH_3O$, 8.09.

Various changes and modifications may be made in carrying out the present invention without departing from the spirit and scope thereof. Insofar as these changes and modifications are within the purview of the annexed claims, they are to be considered as part of our invention.

We claim:

1. The process of preparing 21-alkyl ethers of $\Delta^4$ - 3,11,20 - triketo - 17,21 - dihydroxy - pregnene which comprises reacting alcoholic alkali with a compound selected from the class which consists of $\Delta^{17}$-3,21-dihydroxy-11-keto-20-cyano-pregnene and $\Delta^{17}$ - 3,21 - diacyloxy - 11 - keto-20-cyano-pregnenes, thereby producing $\Delta^{17}$-3-hydroxy - 11 - keto - 20 - cyano - 21 - alkoxy-pregnene, converting this compound to the 17,20-osmate ester of 3,11-diketo-17,20-dihydroxy-20-cyano-21-alkoxy-pregnane, hydrolyzing said osmate ester to form 3,11,20-triketo-17-hydroxy-21-alkoxy-pregnane, reacting this compound with bromine, and heating the resulting 4-bromo derivative with a dehydrohalogenating agent.

2. The process which comprises reacting alcoholic alkali with a compound selected from the class which consists of $\Delta^{17}$-3,21-dihydroxy-11-keto-20-cyano-pregnene and $\Delta^{17}$-3,21-diacyloxy-11-keto-20-cyano-pregnenes; thereby producing $\Delta^{17}$ - 3 - hydroxy - 11 - keto - 20-cyano-21-alkoxy-pregnene, reacting this compound with osmium tetroxide to produce the 17,20-osmate ester of 3,17,20 - trihydroxy - 11 - keto - 20 - cyano - 21-alkoxy-pregnane; reacting this osmate ester with an oxidizing agent followed by a hydrolyzing agent to form 3,11,20-triketo-17-hydroxy-21-alkoxy-pregnane, reacting this compound with bromine to form 3,11,20-triketo-4-bromo-17-hydroxy-21-alkoxy-pregnane, and heating this 4-bromo derivative with a dehydrohalogenating agent to produce $\Delta^4$-3,11,20-triketo-17-hydroxy-21-alkoxy-pregnene.

3. The process of preparing 21-alkyl ethers of $\Delta^4$-3,11,20 - triketo - 17,21 - dihydroxy - pregnene which comprises reacting alcoholic alkali with a compound selected from the class which consists of $\Delta^{17}$-3,21-dihydroxy-11-keto-20-cyano-pregnene and $\Delta^{17}$-3,21-diacyloxy-11-keto-20-cyano-pregnenes, thereby producing $\Delta^{17}$-3-hydroxy-11-keto-20-cyano-21-alkoxy-pregnene, reacting this compound with an oxidizing agent to form $\Delta^{17}$-3,11-diketo-20-cyano-21-alkoxy-pregnene, reacting said $\Delta^{17}$-3,11-diketo-20-cyano-21-alkoxy-pregnene with osmium tetroxide and hydrolyzing the osmate ester thus obtained to form 3,11,20-triketo-17-hydroxy-21-alkoxy-pregnane, reacting this compound with bromine, and heating the resulting 4-bromo-derivative with a dehydrohalogenating agent.

4. The process of preparing $\Delta^4$-3,11,20-triketo-17-hydroxy-21-methoxy-pregnene which comprises reacting $\Delta^{17}$-3,21-dihydroxy-11-keto-20-cyano-pregnene with a methanolic solution of sodium hydroxide to produce $\Delta^{17}$-3-hydroxy-11-keto - 20 - cyano - 21 - methoxy - pregnene, reacting this compound with an oxidizing agent to form $\Delta^{17}$ - 3,11 - diketo - 20 - cyano - 21 - methoxy - pregnene, reacting said $\Delta^{17}$ - 3,11 - diketo-20-cyano-21-methoxy-pregnene with osmium tetroxide and hydrolyzing the osmate ester thus obtained to produce 3,11,20-triketo-17-hydroxy-21-methoxy-pregnane, reacting the latter compound with bromine to form 3,11,20-triketo-4-

4 - bromo - 17 - hydroxy - 21 - methoxy - pregnane, and heating this 4-bromo derivative with a dehydrohalogenating agent to produce $\Delta^4$-3,11,20-triketo-17-hydroxy-21-methoxy-pregnene.

5. The process of preparing $\Delta^4$-3,11,20-triketo-17-hydroxy-21-methoxy-pregnene which comprises reacting $\Delta^{17}$-3,21 - dihydroxy - 11 - keto-20-cyano-pregnene with a methanolic solution of sodium hydroxide to produce $\Delta^{17}$-3-hydroxy-11-keto-20-cyano-21-methoxy-pregnene, reacting this compound, in solution in tertiary butanol and pyridine, with N-bromoacetamide thereby oxidizing the 3-hydroxy substitutent to a keto radical to form $\Delta^{17}$ - 3,11 - diketo - 20 - cyano-21-methoxy-pregnene, reacting said $\Delta^{17}$ - 3,11-diketo - 20 - cyano - 21 - methoxy - pregnene with osmium tetroxide in benzene solution containing pyridine and reacting the osmate ester thus obtained with an aqueous solution containing sodium sulfite to produce 3,11,20-triketo-17-hydroxy-21-methoxy-pregnane, reacting the latter compound with bromine in acetic acid solution to form 3,11,20 - triketo - 4 - bromo - 17-hydroxy-21-methoxy-pregnane, and heating this 4-bromo derivative with collidine under reflux to produce $\Delta^4$ - 3,11,20 - triketo - 17 - hydroxy-21-methoxy-pregnene.

6. The process of converting the 3-hydroxy substituent of $\Delta^{17}$ - 3,21 - dihydroxy - 11 - keto-20-cyano-pregnene to a 3-keto-radical without, at the same time, oxidizing the hydroxy radical attached to the 21-carbon atom, which comprises reacting said $\Delta^{17}$ - 3,21 - dihydroxy - 11 - keto-20-cyano-pregnene with a solution of an alkali metal hydroxide in a lower aliphatic alcohol thereby producing $\Delta^{17}$ - 3 - hydroxy - 11 - keto-20-cyano-21-alkoxy-pregnene, and reacting this compound with an oxidizing agent.

7. The process which comprises reacting a compound selected from the class which consists of $\Delta^{17}$ - 3,21 - dihydroxy - 11 - keto - 20 - cyano-pregnene and $\Delta^{17}$ - 3,21 - diacyloxy 11 - keto-20-cyano-pregnenes, with a solution of an alkali metal hydroxide in a lower aliphatic alcohol thereby producing $\Delta^{17}$ - 3 - hydroxy - 11 - keto-20-cyano-21-alkoxy-pregnene.

8. The process which comprises reacting $\Delta^{17}$-3,21 - dihydroxy - 11 - keto - 20 - cyano - pregnene with a solution of sodium hydroxide in methanol to produce $\Delta^{17}$-3-hydroxy-11-keto-20-cyano-21-methoxy-pregnene.

9. The process which comprises reacting $\Delta^{17}$-3,21 - dihydroxy - 11- keto - 20 - cyano - pregnene with a solution of sodium hydroxide in ethanol to produce $\Delta^{17}$-3-hydroxy-11-keto-20-cyano-21-ethoxy-pregnene.

10. The process for preparing 21-alkyl ethers of $\Delta^{17}$ - 3,21 - dihydroxy - 11 - keto - 20 - cyano-pregnene which comprises reacting a solution of an alkali metal hydroxide in a lower aliphatic alcohol with a compound selected from the class which consists of the isomer of $\Delta^{17}$-3,21-dihydroxy-11-keto-20-cyano-pregnene melting at approximately 260–262° C. and 3,21-diacyl derivatives thereof, thereby producing a mixture consisting of the isomer of $\Delta^{17}$-3,21-dihydroxy-11-keto-20-cyano-pregnene melting at 234–235° C. and its 21-alkyl ether, and recovering said 21-alkyl ether of $\Delta^{17}$-3,21-dihydroxy-11-keto-20-cyano-pregnene from said mixture.

11. The process which comprises reacting the isomer of $\Delta^{17}$-3,21-dihydroxy-11-keto-20-cyano-pregnene, melting at 234–235° C., with a solution of sodium hydroxide in methanol to produce $\Delta^{17}$-3-hydroxy - 11-keto - 20-cyano-21-methoxy-pregnene.

12. The process which comprises reacting $\Delta^{17}$-3-hydroxy-11-keto-20-cyano-21-alkoxy-pregnene with an oxidizing agent to form $\Delta^{17}$-3,11-diketo-20-cyano-21-alkoxy-pregnene, reacting this compound with osmium tetroxide and hydrolyzing the osmate ester thus obtained to form 3-11,20-triketo-17-hydroxy - 21-alkoxy-pregnane, reacting this compound with bromine, and heating the resulting 4-bromo derivative with a dehydrohalogenating agent to produce $\Delta^4$-3,11,20-triketo-17-hydroxy-21-alkoxy-pregnene.

13. The process which comprises reacting $\Delta^{17}$-3-hydroxy-11-keto-20 - cyano-21-methoxy-pregnene with N-bromoacetamide in solution in tertiary butanol containing pyridine to produce $\Delta^{17}$-3,11,-diketo-20-cyano-21-methoxy-pregnene, reacting this compound, in solution in benzene containing pyridine, with osmium tetroxide to produce the 17,20-osmate ester of 3,11-diketo-17,20-dihydroxy-20-cyano-21 - methoxy-pregnane, reacting said osmate ester with an aqueous solution containing sodium sulfite to form 3,11,20-triketo-17-hydroxy-21-methoxy pregnene, reacting this compound with bromine in acetic acid solution to produce 3,11,20-triketo-4-bromo-17-hydroxy-21-methoxy-pregnane, and heating this 4-bromo-derivative with collidine to produce $\Delta^4$-3,11,20-triketo-17-hydroxy-21-methoxy-pregnene.

HUANG MINLON.
JOHN C. BABCOCK.

References Cited in the file of this patent

UNITED STATES PATENTS

| Number | Name | Date |
|---|---|---|
| 2,462,133 | Sarett | Feb. 22, 1949 |
| 2,541,104 | Sarett | Feb. 13, 1951 |
| 2,541,105 | Sarett | Feb. 13, 1951 |

OTHER REFERENCES

Sarett: Jour. Biol. Chem. 162, 601–631, (1946).
Sarett: Jour. Am. Chem. Soc. 70, 1454–1458 (1948).